Figure 1:
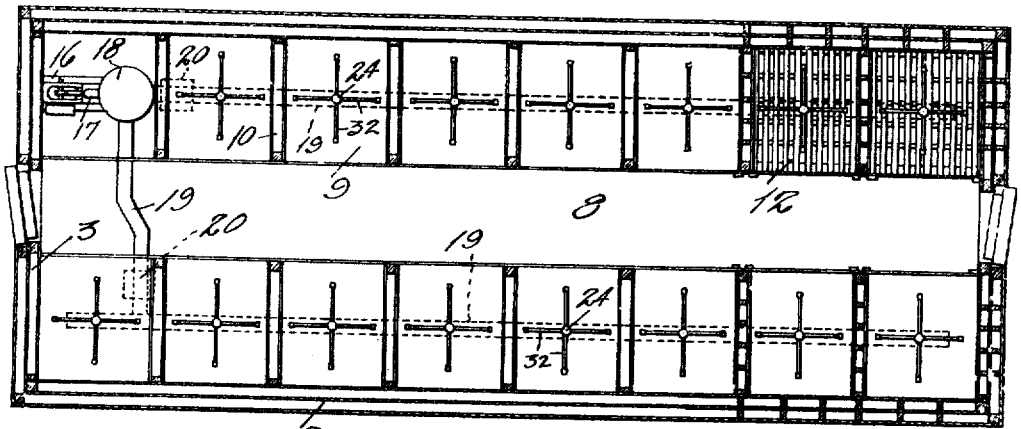

C. R. TAYLOR.
DEHYDRATING APPARATUS.
APPLICATION FILED FEB. 7, 1919.

1,319,978.

Patented Oct. 28, 1919.
2 SHEETS—SHEET 1.

Inventor
C. R. Taylor

Attorney

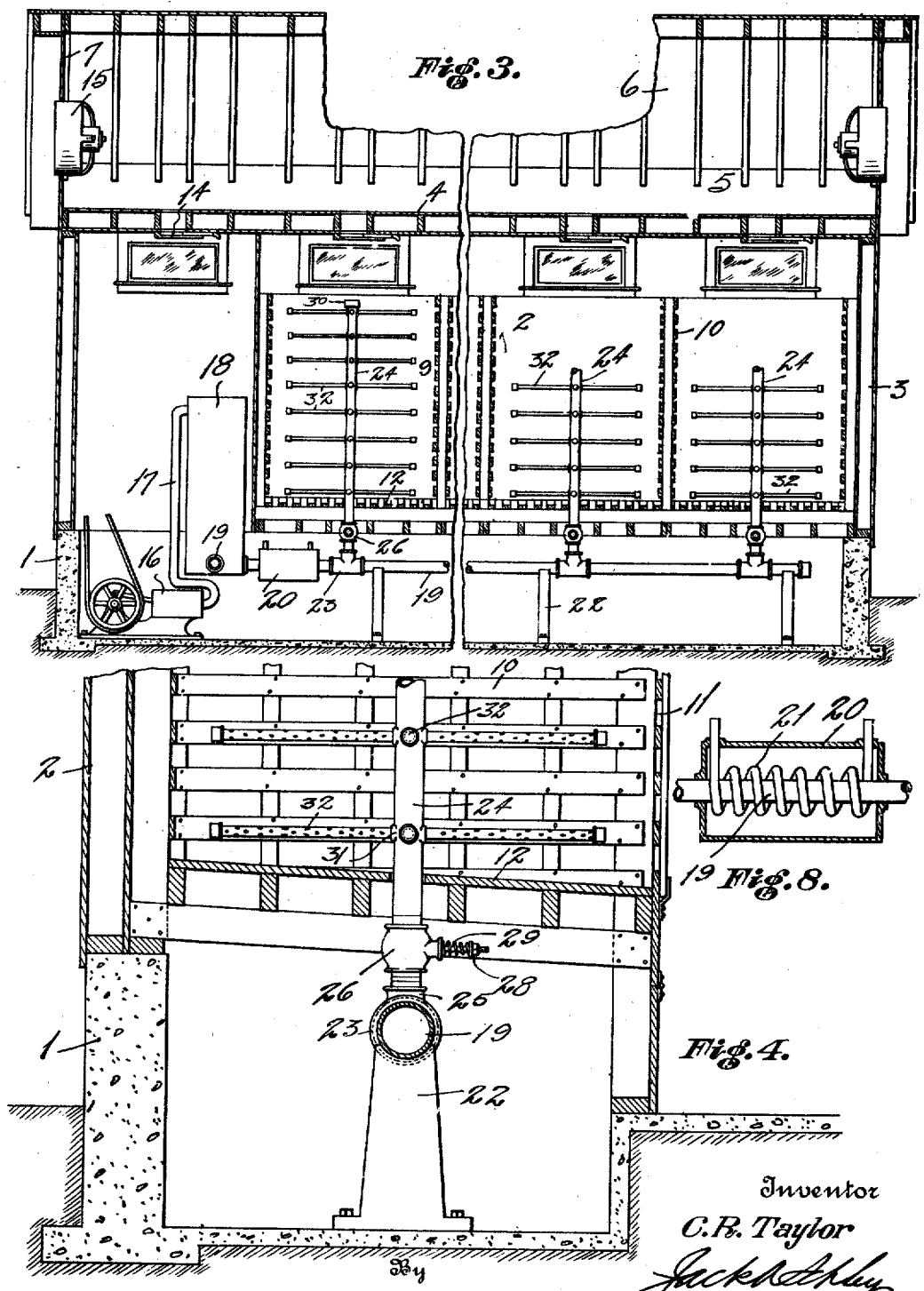

UNITED STATES PATENT OFFICE.

CLARENCE R. TAYLOR, OF FORT WORTH, TEXAS.

DEHYDRATING APPARATUS.

1,319,978.      Specification of Letters Patent.      Patented Oct. 28, 1919.

Application filed February 7, 1919. Serial No. 275,512.

*To all whom it may concern:*

Be it known that I, CLARENCE R. TAYLOR, a citizen of the United States, residing at Fort Worth, in the county of Tarrant and State of Texas, have invented certain new and useful Improvements in Dehydrating Apparatus, of which the following is a specification.

This invention relates to new and useful improvements in dehydrating apparatuses.

Considerable advance has been made in the art of dehydrating or curing vegetables and vegetable matter. It has been customary to store the produce or material in bins in a suitably constructed house and subject the same to tempered air for a given period or periods. Several different structures have been used with more or less satisfactory results, but after long experience and careful study I have evolved a system and theory which I believe to be superior to anything yet produced.

I propose to store air under pressure then temper this air to the desired degree and then deliver it to the bins at a predetermined pressure which may be individually regulated at each bin. It is particularly sought to distribute the air laterally through the produce which is stored in the bins thus assuring an even distribution with corresponding results.

In carrying out the invention it is proposed to construct a suitable curing house equipped with a plurality of bins having provision for admitting air to the bins and exhausting said air through the ceiling of the building whereby a circulation of air may be had. A storage tank is employed and connected with a suitable air compressor whereby air is stored in the tank under pressure. A supply pipe leads from the storage tank and passes through a tempering device whereby the air in the pipe may be heated or cooled to the proper degree. The supply pipe extends under the bins and stand pipes rise from the supply pipe and extend up through the center of the bins. Discharge pipes or nozzles radiate from the stand pipes at different elevations so as to distribute the air laterally through the contents of the bins. It is also proposed to make the nozzles detachable and close their openings in the stand pipes so that if a bin is only partially filled, the nozzles which are not covered by the contents may be removed thus assuring a circulation and distribution throughout the contents as will be obvious. Means is provided under each bin for regulating the pressure of the air delivered to the stand pipes and in this way the pressure for each bin may be individually controlled.

The invention will be more readily understood from a reading of the following specification and by reference to the accompanying drawings, in which an example of the invention is illustrated, and wherein—

Figure 6:
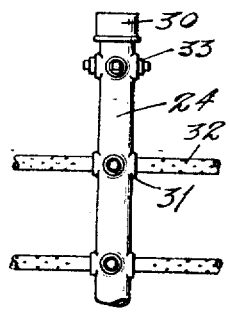
Figure 7:
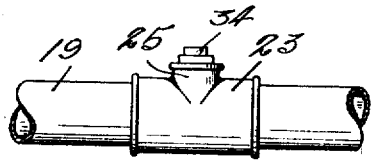
Figure 5:
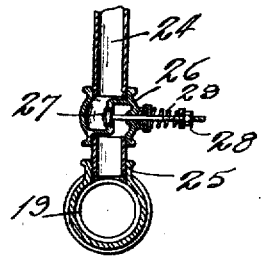
Figure 2:
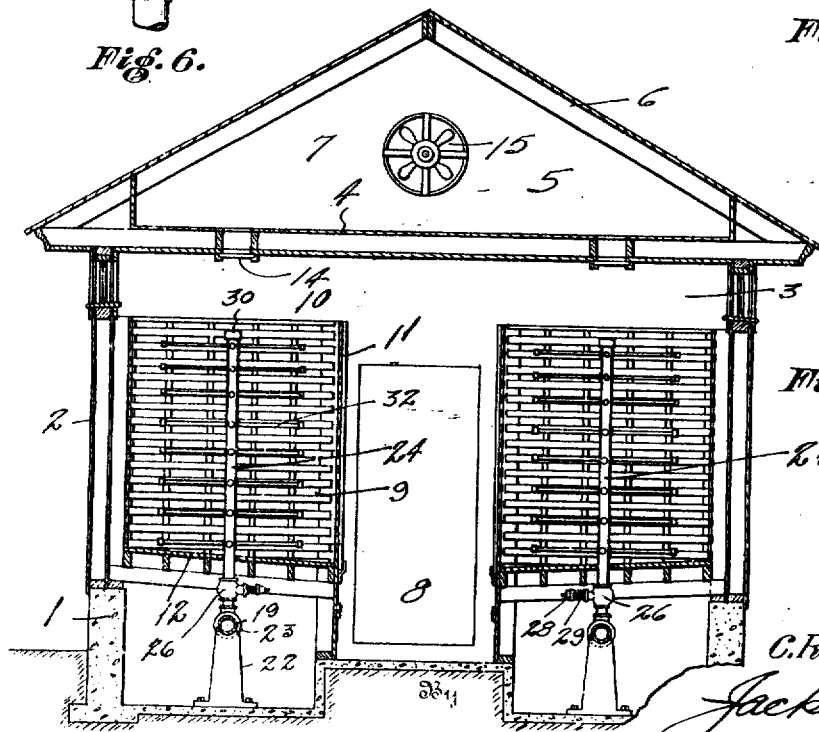

Figure 1 is a horizontal cross sectional view through the building and showing a dehydrating apparatus constructed in accordance with this invention, Fig. 2 is a tranverse vertical sectional view of said house, Fig. 3 is a longitudinal sectional view of the same, Fig. 4 is a transverse sectional detail through one of the bins, Fig. 5 is a sectional detail of the pressure regulating valve and adjacent parts, Fig. 6 is a detail of one of the stand pipes, Fig. 7 is a detail of the T connection used for the supply pipe and stand pipes, and Fig. 8 is a sectional detail of the air tempering device.

In the drawings the numeral 1 designates a foundation on which upright side walls 2 and end walls 3 are built. These walls are constructed as insulators so as to retain the heat within the building. An insulating ceiling 4 is provided above which is arranged a loft 5 covered by a roof 6 having gables 7 at each end. The building is provided with a central aisle 8 on each side of which bins 9 are arranged. The bins are separated by vertical upright slatted walls 10 and each has a front 11 at the aisle composed of horizontal bars which may be removed or placed one at a time in emptying or filling the bins. Each bin has a slatted floor 12 inclined downward toward the aisle. The bins do not extend to the ceiling and dampers 14 are provided in the ceiling over each bin, whereby communication with the loft 4 may be established or cut off as desired. This is for the purpose of ventilation and ventilating fans 15 are mounted in the gable 7.

At one end of the building I mount a suitable air compressor 16 which may be driven in any approved manner. A pipe 17 leads from the compressor to the top of an air storage tank 18 from the bottom of which supply pipes 19 lead. One of these pipes passes centrally under the bins on one side of the house and the other extends across the house and is connected at right angles so as to extend under the other row of bins. Each supply pipe extends through a tempering device 20, which, as shown in Fig. 8, includes a coil 21 surrounding the feed pipe within said device. The device 20 incloses the pipe so as to insulate the same, and either a heating or a cooling agent may be circulated through the coil 21 thus tempering the air in the pipe 19 as it passes through the device.

The pipes 19 are mounted on supports 22 and under the center of each bin a T-coupling 23 is connected in each feed pipe. Stand pipes 24 have their lower ends screwed into the upwardly directed T's 25 of each coupling 23. Each stand pipe includes a pressure regulating valve casing 26 immediately above its lower end and below the floor 12 of its bin. A valve 27 is seated in the casing and has its stem projecting through the same and is provided with an adjusting nut 28. A coiled spring 29 is confined on the valve stem between the nut and the valve casing whereby the valve is held under spring tension and seated. By adjusting the nut 28 to increase or decrease the tension of the spring the unseating of the valve by the air pressure may be controlled. Thus the air may be delivered under more or less pressure as desired and this pressure may be individually controlled at each bin.

The stand pipes extend upward in the bins to the desired height and are closed at their upper ends, each by a cap 30. At different elevations each stand pipe is provided with radial nipples 31. Horizontal perforated pipes or nozzles 32 are screwed into the nipples as shown. These nozzles radiate in the bin and their length may be varied as required. The lowermost nozzles are immediately above the floor of each bin so as to distribute the air thoroughly in all directions throughout the bottom of the bin. The nozzles may be disposed at regular intervals, but it is obvious that a less number of nozzles would ordinarily be required at the upper portions of the bins as the liberated air will tend to rise from the bottom to the top of the bin; particularly in view of the fact that air at atmospheric pressure may enter the bottom and sides of the bins and is drawn out with the liberated air through the ceiling of the house. The nozzles will distribute the air in courses so that the contents of the bins will be thoroughly aerated either by heated or cooled air as the nature of the contents may require.

It is obvious that if a bin was only partially filled the compressed air would escape more readily from the nozzles above the top of the contents and thus the distribution of air from the nozzles covered by the contents of the bin would be considerably below the requirement. To take care of such a condition the upper nozzles 32 are removed and plugs 33 are screwed into the nipples 31 whereby the latter are closed (as shown in Fig. 6) and the air thus distributed only below the top of the contents of the bin. Where it is desired not to use a bin its stand pipe is bodily unscrewed from the T 25 and a plug 34 inserted in said T as shown in Fig. 7.

What I claim is,

1. In a dehydrating apparatus having storage bins, means for compressing air, means for tempering the compressed air, a stand pipe disposed in each storage bin, radial nozzles extending from each pipe, means for conveying the compressed and tempered air to the stand pipes, and means for individually regulating the pressure of air at each stand pipe.

2. An air distributing device for a storage bin including a stand pipe, radial nozzles extending from said pipe, and a spring pressed air regulating valve connected with the lower end of the stand pipe.

3. In a dehydrating apparatus having a plurality of storage bins, stand pipes having radial nozzles arranged in the bins, an air feed pipe under the bins and connected with the stand pipes, pressure regulating valves at the intersections of the feed and stand pipes, an air compressor, a storage tank connected with the compressor for receiving air therefrom and also connected with the feed pipe for supplying compressed air to said feed pipe, and a tempering device surrounding the feed pipe between the storage tank and the first stand pipe.

In testimony whereof I affix my signature.

CLARENCE R. TAYLOR.

Copies of this patent may be obtained for five cents each, by addressing the "Commissioner of Patents, Washington, D. C."